Figure 1:
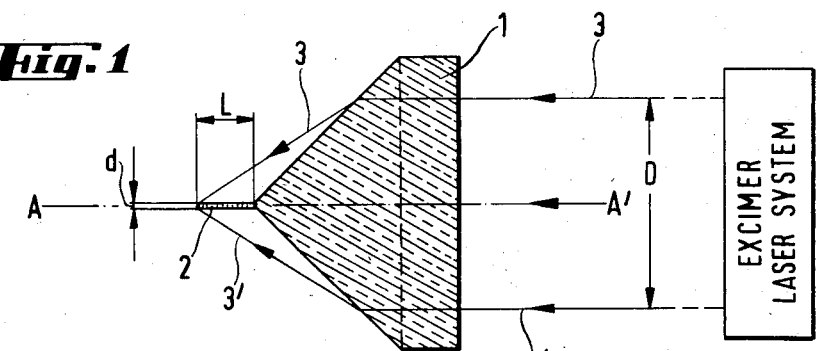

United States Patent [19]

Schäfer

[11] Patent Number: 4,630,274
[45] Date of Patent: Dec. 16, 1986

[54] METHOD AND APPARATUS FOR GENERATING SHORT INTENSIVE PULSES OF ELECTROMAGNETIC RADIATION IN THE WAVELENGTH RANGE BELOW ABOUT 100 NM

[75] Inventor: Fritz P. Schäfer, Goettingen, Fed. Rep. of Germany

[73] Assignee: Max-Planck-Geselschaft zur Foerderung der Wissenschaften e.V., Fed. Rep. of Germany

[21] Appl. No.: 673,615

[22] Filed: Nov. 20, 1984

[30] Foreign Application Priority Data

Nov. 24, 1983 [DE] Fed. Rep. of Germany ....... 3342531

[51] Int. Cl.⁴ .............................................. H01S 3/10
[52] U.S. Cl. .................................... 372/9; 372/5; 372/108; 372/25; 350/437
[58] Field of Search .................. 372/5, 108, 25, 9, 95; 350/437

[56] References Cited

U.S. PATENT DOCUMENTS 4,514,850 4/1985 Holmes et al. ...................... 372/95
4,516,244 5/1985 Holmes ................................ 372/95

Primary Examiner—Leon Scott, Jr.
Attorney, Agent, or Firm—Kinzer, Plyer, Dorn & McEachran

[57] ABSTRACT

In a method and an apparatus for generating a hot plasma which emits electromagnetic radiation in the wavelength range below about 100 nm in a predetermined volume, in which a laser radiation pulse of short duration with sufficient energy and power density is focused into the volume containing a target material, the laser radiation energy which is necessary for generating the plasma emitting the radiation is radiated into the target volume by a focused laser radiation pulse which is shorter than one picosecond. The method may be used in ASE X-ray laser comprising an axicon focusing optics.

10 Claims, 6 Drawing Figures

METHOD AND APPARATUS FOR GENERATING SHORT INTENSIVE PULSES OF ELECTROMAGNETIC RADIATION IN THE WAVELENGTH RANGE BELOW ABOUT 100 NM

The present invention relates generally to a method and apparatus for generating electromagnetic radiation pulses, in particular of radiation pulses of high intensity and radiation density in the wavelength range below 100 nanometers ($10^3$ Å).

In a very great variety of uses in basic research in physics, chemistry and biology, and in medicine and engineering, it is extremely desirable to have available an X-ray radiation source which is as punctiform as possible, has a high brilliance, and emits flashes as short as possible. When X-ray radiation is referred to it is intended to include the range of vacuum ultraviolet (VUV) because the transition from hard or vacuum ultraviolet to the soft X-ray range of the electromagnetic spectral range is gradual and there is no generally accepted convention for the boundary between these two ranges. There would not be much point to a boundary distinction from the physical aspect, in any case, because the usual known methods for generating such electromagnetic radiation can be applied in the entire wavelength range from above 100 nm to about 0.01 nm (1000 Å to 0.1 Å).

For about fifteen years throughout the world many study groups have been trying to develop such an X-ray radiation source inter alia in the form of a laser-induced plasma. Such a plasma arises in the focus of a high-power pulse-laser when solid or gaseous substances of adequate density are disposed in the focal region. With power densities in the focal region of about $10^{13} W/cm^2$ and above X-ray emission from this plasma has been observed. Many efforts were made in particular to obtain not only a spontaneously emitting X-ray radiation source but as far as possible a coherent or partially coherent radiation source, i.e. an X-ray laser. It was very soon agreed that it would be extremely difficult, if not completely impossible, to obtain a laser in its true sense, i.e. with the radiating material in the interior of a resonator from which the laser beam is then coupled out, since in the X-ray range no mirrors are known having a reflection adequate enough to enable a resonator of sufficiently low loss to be made. As the only alternative the possibility was recognized, in an elongated inverted medium, of intensifying the spontaneous emission produced at one end along the axis of the medium by stimulated emission. The strong partially coherent radiation then arising at the other end is also referred to in German generally as ASE, the initials of Amplified Spontaneous Emission. An excellent summary of the physical fundamentals and the experimental and theoretical work so far in this field is given by the review "Review of Short Wavelength Laser Research"

by R. W. Waynant and R. C. Elton (Proc. of IEEE, Vol. 64, 1059–1092, 1976).

Other more recent reviews, in some cases also discussing applications are:
"EXPERIMENTS WITH VERY HIGH POWER LASERS", Report of a Workshop, Nov. 29–30, 1979, held at the Laboratory for Laser Energetics, College of Engineering and Applied Science, University of Rochester, 250 East River Road, Rochester, N.Y. 14623;

J. M. Forsyth and R. D. Frankel, "Flash X-ray Diffraction from Biological Specimens Using a Laser Produced Plasma Source: A Progress Report", Report No. 106, June, 1980, Laboratory for Laser Energetics, College of Engineering and Applied Science, University of Rochester, 250 East River Road, Rochester, N.Y. 14623;

G. J. Pert: "XUV and X-ray Lasers", in "Lasers - Physics, Systems and Techniques;" Ed. W. J. Firth and R. G. Harrison, Proc. of the Twenty-third Scottish Universities Summer School in Physics, Edinburgh, Aug. 1982, 327–345, SUSSP Publications, Edinburgh University Physics Department, King's Buildings, Mayfield Road, Edinburgh.

Although for reasons of space a detailed discussion cannot be made of all difficulties encountered in realizing a laser plasma X-ray source, and for details reference must be made to the above reviews and the several hundred citations from original works cited there, a few essential points will be briefly discussed to facilitate the explanation of the objective of the present invention and the advance achieved over the prior art.

The first substantial difficulty is the production of an adequately high power density in the focal region of the laser so that the electrical field strength there is above $10^5$ V/cm in order to overcome the atomic field strengths and be able to ionize atoms. This threshold must not only be reached but considerably exceeded to enable multiple ionisation of the atoms to produce X-ray line emission by refilling vacancies of the inner electron shells (at the same time a continuum is generated by brems radiation).

Hitherto, to generate such high power densities only very large existing laser equipment was considered. This equipment was originally developed for other purposes, for example laser-induced nuclear fusion, and designed for the highest possible output power. In particular, it includes neodymium glass lasers and iodine lasers as well as $CO_2$ lasers which in laser, pulses of about 50 ps to some nanoseconds duration emit energies between a few joules and a few kilojoules. The pulse duration of these high-power lasers is dependent on the primary intended use or other aspects not related to the production of plasmas emitting X-ray radiation.

The optical elements of high-power lasers of the aforementioned type must generally have large diameters so that the destruction threshold is not exceeded by excessive laser radiation power density. This in turn necessitates a focusing optical system of very large diameter which is very difficult to make and correct well enough to obtain a diameter of the focal spot or cross-over point of a size as calculated theoretically from the beam divergence of the laser beam; on the contrary, the radiation is concentrated generally on a substantially larger area so that the theoretically possible power density is not achieved.

Another difficulty making even greater increasing of the power density necessary is the high cooling rate of the plasma by radiation and expansion. Even in the case of the shortest laser pulses hitherto used for these purposes of over 50 picoseconds FWHM (full width at half maximum) the cooling rate of the plasma is large compared with the rise rate of the laser power so that a quasi-stationary state arises. In that state, during the entire rise time of the laser pulse up to the desired peak power, the cooling losses must be continuously replaced by the incident laser power. Although many attempts have been made to advantageously utilize the expansion by observing the recombination radiation on expansion into vacuum and on expansion against an ambient gas by almost resonant charge exchange with said gas generating an inversion therein, because of the volume increased by a factor of about 1000 with respect to the original plasma volume, very low radiation densities are obtained. The inversions are far too small to bring the rate of the stimulated emission above that of the spontaneous emission as would be necessary for an ASE X-ray laser.

In the attempts to develop X-ray lasers, even if only in the form of an ASE laser, a particularly great difficulty is found to be the short life of the excited states in the X-ray range. At the beginning proposals were made for overcoming this difficulty by utilizing a travelling wave stimulation. For example, by forming between the longitudinal extent of the medium to be irradiated and the wave front of the stimulating laser beam a certain angle, on suitable choice of the angle it is possible always to achieve that the stimulation of the atoms in the medium is propagated from the proximal end to the distal end in the medium with the speed of light. As a result, with sufficiently high stimulation energy the spontaneous radiation firstly produced at the proximal end undergoes an inversion in the direction towards the distal end, so that it can be intensified by stimulated emission and finally emerges at the other end with correspondingly high intensity as a partially coherent ASE beam. However, so far in the literature no arrangement has been explained by which such a travelling wave stimulation can be obtained with the necessary accuracy. Due to the focusing elements, e.g. cylindrical lenses, very great deviations compared with the ideal behaviour occur, and for this reason this approach has so far not been adopted.

Finally, a further difficulty is the high reflection of the incident laser light by the cloud of rapidly spreading free electrons. As a result, hitherto at the most only about half of the irradiated laser power could actually be absorbed in the plasma whilst the remainder was reflected back and able to cause considerable damage in the laser unless isolated from the latter by complicated electrooptical steps.

In concluding this review, it should also be pointed out that it was found in all experimental work that the effectiveness of X-ray radiation generation increases if shorter laser wavelengths are used. This has been substantiated very recently by a fundamental work by Ch. K. Rhodes and other (T. S. Luk et al., Phys. Rev. Lett. 51, 110–113, July 11, 1983), where in atom and molecule beams an extremely high probability of multiple ionization in the focal region of an ArF laser was found at 193 nm and a radiation intensity of $10^{14}$ W/cm$^2$.

The object of the invention is to provide a method and advantageous apparatuses for carrying out the method, by which hot plasmas of high power density can be produced for generating X-ray radiation flashes of very short duration with extremely high brilliance but with substantially reduced apparatus expenditure and considerably improved yield.

Whereas in the prior art the trend is to ever increasing powers and no attention is paid to the pulse duration, the invention is based on the surprising recognition that with a substantial shortening of the pulse duration an improvement of several orders of magnitude is obtained in the efficiency of the conversion of the laser radiation to the desired VUV or X-radiation, as well as a substantially more effective heating of the plasma. With the invention the incident energy remains localized, i.e. the plasma or radiation source diameter no longer depends on the expansion rate of the plasma but on the focus diameter of the laser radiation. Only when this requirement has been met is there any point in optimizing the beaming quality of the laser and the focusing optical system.

Advantageously, for the focusing a well corrected objective is used which converts the plannar wave of the laser radiation incident with substantially diffraction-limited divergence to a convergent spherical wave in the center of which target material is disposed. For example, an optical system of high numeric aperture (microscope optical system) can be used in conjunction with a laser of correspondingly small beam diameter. It is also possible to use as the focusing optical system a Schwarzschild optical system and, which is particularly preferred at present, an axicon optical system. When using an axicon optical element with simple means it is possible to obtain an at least partially coherent VUV and X-ray radiation by travelling wave stimulation of the plasma.

With the present method it is possible to obtain with substantially lower laser energies than hitherto and/or with substantially improved efficiency very short electromagnetic radiation pulses of high brightness and wavelengths in the vacuum ultraviolet and X-ray range, i.e. in the range from about $10^2$ nm to about $10^{-2}$ nm.

Figure 4:
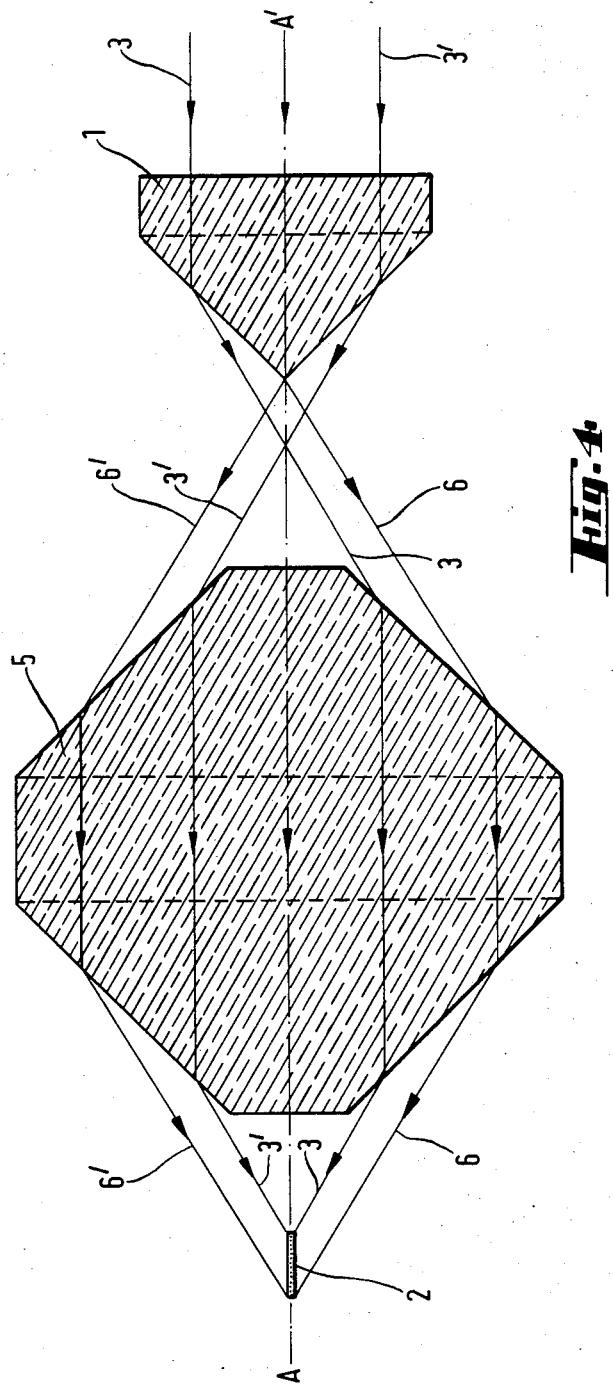
Figure 5:
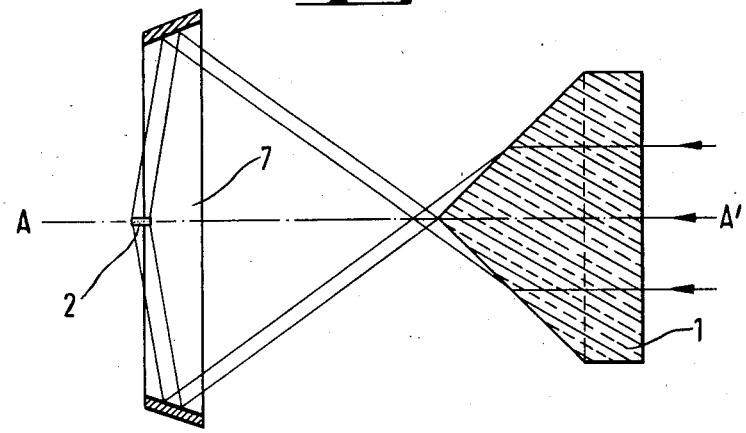
Figure 6:
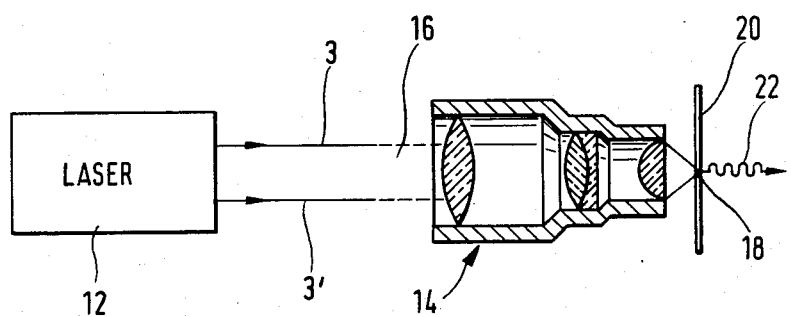

In the following preferred embodiments of the invention will be explained in detail with reference to the drawings, wherein:

FIGS. 1 to 5 show examples of optical systems which can be used for carrying out preferred embodiments of the present method in combination with a laser which is not illustrated in detail and which can produce radiation pulses of duration substantially less than one picosecond; and FIG. 6 is a schematic representation of a further embodiment of an apparatus for carrying out the present method.

An essential feature of the invention resides in the use of a short-wave laser having a pulse duration which is several orders of magnitude shorter than the lasers hitherto employed. In particular, the pulse duration is to be below 1 pico second, for example less than 0.5 ps, preferably below 200 femtoseconds (1 fs=$10^{-15}$sec). It is important that in a time less than one picosecond the entire energy necessary for the desired heating of the plasma or X-ray radiation emission is coupled into the target volume on which the laser is focused.

The rise rate of the laser pulses should advantageously be of the order of magnitude of 100 femtoseconds and below. This in particular is intended to achieve that the rate of supply of the laser radiation energy to the target volume is at least approximately equal to the loss rate of the plasma by irradiation and the like. Advantageously, the pulse energy of the laser used is relatively small and is generally many orders of magnitude smaller than that of the large laser systems which were hitherto used for generating plasma emitting X-rays. Conveniently, the pulse energy is substantially less than one joule so that the operation can be carried out with a small beam diameter and a correspondingly small and thus optimally correctable optical focusing system.

Hitherto, the use of lasers able to supply ultrashort laser pules with a duration less than about one picosecond has never been considered for the generation of plasmas emitting X-ray radiation because it was believed that the relatively low laser energies available with such pulse durations would not be sufficient for efficient generation of such a laser plasma.

As the laser, for example, an Excimer laser may be used as described for example in published British Patent Application 21 40 611 (corresponding to U.S. application Ser. No. 607,320, filed on May 4, 1984). It is most convenient to use a DFB laser (distributed feedback) pumped with short laser radiation pulses as described in the above earlier application, which may be followed by a pulse compressor. As the pulse compressor, for example, an apparatus may be used as described by Nikolaus and Grischkowsky in "Appl. Phys. Lett." 43, page 228, 1983.

With a laser of the latter type, after frequency doubling and amplifying in the Xe Cl laser a pulse full width at half maximum of about 150 fs can be achieved, the pulse energy being 10 mJ and the laser wavelength 308 nm. If the radiation of such a laser is focused on suitable material a plasma is formed which contains electrons which can have an energy up to 10 keV (so called superthermal electrons) as hitherto also observed in the case of plasmas generated with much larger known laser apparatuses. The velocity of an electron with 10 keV energy is just 19% of the speed of light, that is $5.7 \times 10^9$ cm/s. Thus, in 150 fs these electrons can cover at the most a distance of 8.6 $\mu$m. If the target (which is the usual term for the material irradiated to generate the plasma) is for example a cylinder of about 5 $\mu$m diameter and a few millimeters in length the plasma occupies a volume which with certainty is less than 10 times the original target volume. With the usually employed pulse full widths at half maximum, which are a hundred times greater, the electrons correspondingly travel a hundred times farther, i.e. the cylinder diameter expands 100 times and thus the volume to more than 10,000 times. Thus, whereas in the known method the power density is reduced by the expansion in the plasma to one tenthousandth of the power density to be achieved without expansion, by the use according to the invention of short pulse durations of, for example, 150 fs, this reduction of the power density to only 1/10 of that fundamentally possible is achieved and thus an improvement compared with the known method of more than a factor of 1000. In fact, a substantially greater improvement can be obtained because not only the fast electrons but also the ions generated in the plasma by impacts with the electrons are given a similar energy. During the long times generally employed in the known methods, the ions contribute to the expansion cooling, whereas with the short pulse durations used according to the invention the ions can be regarded as practically stationary.

Thus, whereas hitherto as apparent from the above literature based on experience power densities in the target of more than $10^{13}$ W/cm$^2$ had to be achieved, with the short pulse full widths at half maximum an X-ray emission can be achieved at less than $10^{10}$ W/cm$^2$. Of course, the present method is not restricted to such low power densities. For the power density achievable with the aforementioned laser is in practice substantially higher. If the pulse energy of 10 mJ is focused in 150 fs on the surface of a cylindrical target of 5 microns diameter and 2 mm length, on the surface of the target a power density of about $2 \times 10^{14}$ W/cm$^2$ is achieved and thus a correspondingly high brilliance.

A further substantial advantage achieved by using laser pulses of the aforementioned short duration of for example 150 fs is the adaptation of the stimulation period to the decay time of an exited state in the inner shells.

Thus, for example, the natural life of a permitted electronic transition with an oscillator strength of one and a wavelength of 3 nm is precisely 135 fs. However, in the case of light elements this life is considerably reduced by radiationless transitions, e.g. Auger transitions. With elements of medium weight, in particular in the highly ionized condition achieved here, the actual decay times are not appreciably shorter. This achieves an advantageous competition of the stimulated emission with the spontaneous emission without which in particular a travelling wave stimulation is not in fact practicable.

An essential feature of preferred embodiments of the invention is the focusing of the laser beam on a linear target by an optical system including axicons or consisting only of axicons. Axicon is a term applied to the class of optical elements which transform a point on the optical axis to a line on the optical axis and vice versa (J. H. McLeod, J. Opt. Soc. Am., 44, 592, 1954, and ibid. 50, 166, 1960). The fundamental arrangement is shown in FIG. 1. It consists substantially of an optical material which is non-absorbent for the laser beam to be focused (e.g. quartz glass) in the form of a cone 1 having a cylindrical extension for better mounting and centering. The axis of the cone or cylinder coincides with the optical axis A—A'. The plane base area, which is exactly perpendicular to the optical axis, and the surface of the cone are optically machined surfaces whose deviations from ideal surfaces are minimized as far as is technically possible. If a laser beam of diameter D, of which the edge rays 3 and 3' are shown in the sectional illustration of FIG. 1, collinear to the optical axis, is incident on the base area, in accordance with the laws of geometrical optics as is readily apparent this beam is refracted on passage through the surface of the cone towards the optical axis in such a manner that all its rays must pass through the optical axis between the tip of the cone and a point at a distance L therefrom. This region of the optical axis of length L, simply to calculate by the laws of geometrical optics, is now filled with the target 2 to be irradiated in FIG. 1; target 2 has a diameter d and precisely the length L. Whereas the optical radiation power of the laser in the incident beam was distributed over an area $\pi D^2/4$, after passage through the axicon 1 it is concentrated on the generating surface of the target, i.e. on an area $L\pi d$. An irradiation intensity increased by the factor $F = D^2/4dL$ thus results. In the case considered by way of example of an Excimer laser of the aforementioned type with $D = 20$ mm, $d = 5 \cdot 10^{-3}$ mm and $L = 2$ mm, this gives $F = 10^4$. It is immediately apparent that L can be varied within wide limits by the choice of the cone angle and that L tends to zero when the cone angle is made such that the angle of incidence of the laser beam on the inner cone surface approximates the limit angle of total reflection for the material used.

The use of an axicon as a focusing optical element surprisingly results in another important advantage, which is the possibility of travelling wave stimulation as already described and desirable at the beginning but hitherto not practicable. This will be explained in greater detail with reference to FIG. 2, in which the region of the target 2 in FIG. 1 is shown to a larger scale and in which the hatched area filled by the electromagnetic wave of the laser pulse is shown with its wavefront 4 at an instant at which the wavefront is just leaving the tip of the axicon cone 1 and impinging on the end of the target 2 lying at the tip of the cone 1. The wavefront 4 forms with the longitudinal axis of the target 2 an angle $\alpha$ whose magnitude can be derived from an elementary calculation.

Figure 2:
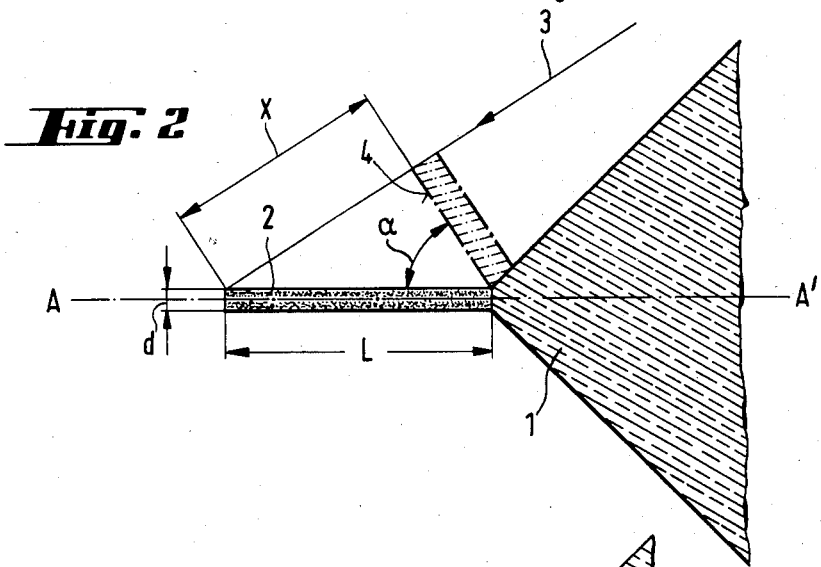

It is immediately apparent that the geometrical location at which the propagating wavefront intersects the target surface passes from the right end of the target to the left end thereof in a time during which the wavefront advances by a distance x shown in FIG. 2 along the edge ray 3. Since the distance x is always smaller than the distance L it is immediately apparent that the stimulation in the target material travels with a greater velocity than the wavefront. Since the refractive index of almost all substances in the X-ray range is smaller than one and thus the phase velocity of the X-ray radiation is greater than the speed of light, by suitably selecting the angle $\alpha$ (which in turn is defined by the cone angle and the refractive index of the axicon 1) the propagation speed of the stimulation in the target material can be made just equal to the phase velocity of the X-ray radiation of the desired wavelength in said material. In this manner an X-ray wave is produced which travels from right to left in FIG. 2 and is continuously intensified by stimulated emission whilst in all other spatial directions, in particular to the right in FIG. 2, only a relatively unimportant part of the total emission is irradiated. This arrangement thus represents an ASE laser which, depending on the choice of the target material and the pump conditions, can operate in the entire range given above of about 100 nm to 10 pm (1000 Å to 0.1Å).

Figure 3:
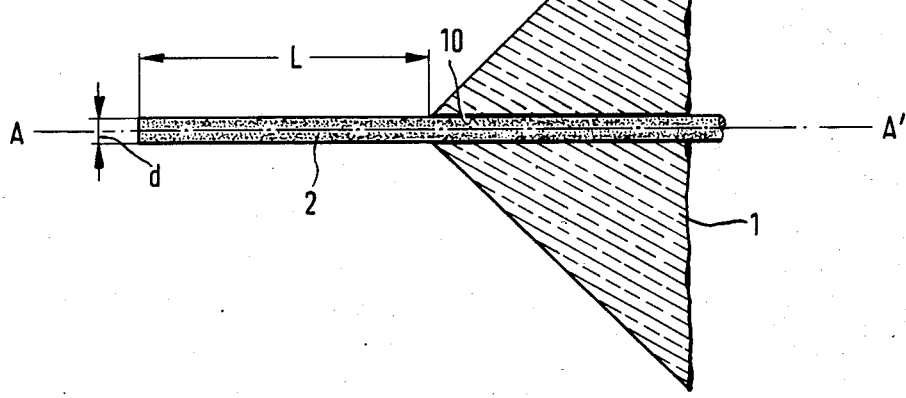

The technical solution of the problem of holding the target exactly centered in the correct position and replacing it after vaporization by a new target in an easy automatable manner is shown in FIG. 3. As indicated therein, for this purpose the axicon 1 is made such that it comprises a cylindrical passage or cylindrical bore 10 coaxial with the axis 1 and having a diameter only a few micrometers greater than the diameter d of the target 2 to be irradiated. The latter is extended from the base area of the axicon through the entire bore until it projects beyond the tip of the axicon precisely by a length L required as the target length. After vaporization of the irradiated target material from behind the target material is replenished, for example by mechanical means or by applying pressure, until once again the necessary length L projects beyond the tip of the axicon. It is remarkable that in this simple manner the target is always exactly centered and also has a good mechanical mounting. It is particularly to be emphasised that by this manner of supplying the target material to the irradiation space gaseous targets can also be used by passing through the bore in good time before initiation of the laser flash as a gas stream, with correspondingly high pressure so that a gas stream of adequate density forms an adequate length beyond the tip of the axicon. A great variety of gases, vapours and mixtures thereof can be used as such gaseous targets, including $UF_6$, HD, HT, $Ni(CO)_4$, etc.

FIG. 4 illustrates another embodiment of the focusing optical system in which the target 2 can be disposed at any distance from the last focusing element. As in the preceding Figures this is a radial section of a rotational-symmetrical arrangement with the optical the axis A—A' as axis of rotation. The first optical element is once again a conical axicon 1 as disposed in FIG. 1, but in this case in its focusing line there is no target material and the laser beam splits, after leaving the focal region, into an annular radiation beam whose edge rays are denoted in the sectional drawing according to FIG. 4 by 6 and 6'. This annular beam now enters a further axicon 5 made as a double cone. In the example illustrated in FIG. 4 the axicon 5 is a double truncated cone cut off on both sides and having the same cone angles for the two halves of the axicon. It is immediately apparent without further explanation that different cone angles, which also need not be identical to the cone angle of the axicon 1, can also be selected for the axicon 5 and that materials of different refractive indices may be used. Finally, the dimensions of the axicon 5, as readily apparent from FIG. 4, depend on the distance between the two axicons on the one hand and the distance between the axicon 5 and the target 2 in the focusing region of the second axicon on the other. As is apparent from FIG. 4, the focusing region in which the target 2 is disposed is in a space freely accessible from all sides; this can be important for many uses. It is no doubt superfluous to point out that the space between the two axicons 1 and 5 must be evacuated so that in the focal region of the axicon 1 no plasma is formed, which would absorb the laser energy here instead of passing it on to the target 2.

In the arrangements of FIGS. 1-4 purely refraction optical systems were used. Obviously, reflecting axicons may also be employed, or hybrid systems which operate partly by refraction and partly be reflection. FIG. 5 shows such an embodiment. A conical axicon 1 as in FIG. 1 is again used in transmission, and then an axicon 7. The axicon 7 has the form of an inwardly silvered hollow conical ring which, as shown in FIG. 5, focuses the annular laser beam on the target 2. By the choice of the cone angle and the refractive index of the axicon 1 the length of the focal region thereof is fixed. Since the ring width of the annular laser beam is not changed by the reflection at the axicon 7, the length of the focal region of the axicon 7 can never be below the value of the length of the focal region of the axicon 1 but at the most can become greater, that is when the rays of the annular beam reflected by the axicon 7 are not perpendicular to the optical axis.

By the choice of the cone angle of the axicon 7 the angle between the wavefront and the optical axis can be set to the desired value. As is apparent, by using a refraction axicon and a reflection axicon a greater freedom is obtained as regards the adaptation of the length of the focal region to the target length and the desired angle between the wavefront and optical axis, for obtaining the travelling wave stimulation.

By deviations from exact conical faces, always however retaining rotational symmetry, if necessary further modifications can be achieved, such as local dependence of the propagation speed of the stimulation in the target by a curved wavefront and/or local dependence of the focused power density on the target surface.

By using two or more axicons, possibly in combination with further optical elements, the skilled artisan can adapt the focusing means to the aforementioned physical conditions and can keep within wide limits relating to other general conditions, such as maximum dimensions, maximum permitted weight, or maximum production costs, without departing from the scope of the invention.

FIG. 6 shows an embodiment of the invention which includes a laser 12 of the aforementioned type and an optical focusing system 14 in the form of an objective corrected as well as possible for the wavelength of the laser radiation used, e.g. a microscope objective of high numeric aperture. The numeric aperture may for example advantageously be greater than 0.4, for example greater than 0.6 and can be up to 0.95.

By the well corrected focusing optical system 14 a laser radiation beam 16 defined by the edge rays 3, 3' and of relatively large cross-section, with diffraction-limited divergence, can be focused on a very small volume 18 of a target material consisting for example of a thin foil 20 and with a relatively low laser radiation power, which may for example lie in the megawatt range. In this manner a source for X-ray radiation 22 can be obtained which is very compact and has a high radiation density.

The optical focusing system 14 may be made in conventional manner and no particular attention need be paid to colour correction if the optical system is used with a laser of a certain wavelength.

I claim:

1. Apparatus for generating short duration pulses of high intensity electromagnetic radiation in a wavelength range of approximately 100 to 0.01 nanometers emanating from a source of predetermined volume, comprising:
    an input laser emitting laser radiation pulses of given irradiation intensity and energy, each of said radiation pulses having a given maximum cross-sectional dimension D, and a duration of less than one picosecond;
    an optical focusing system for focusing each laser radiation pulse into a predetermined focal volume, at the focus of the optical system, said focal volume having dimensions substantially smaller than the maximum laser pulse dimension D, to irradiate said focal volume at a substantially higher irradiation intensity than said given irradiation intensity;
    and a target, having a volume approximating said predetermined focal volume, positioned at the focus of said optical system, the target comprising a material which generates a hot plasma emitting radiation in said wavelength range when irradiated at said higher intensity.

2. Apparatus for generating high intensity short duration pulses of electromagnetic radiation according to claim 1, in which the input laser is a distributed-feedback laser operating in the UV range and is coupled to a pulse compressor.

3. Apparatus for generating high intensity short duration pulses of electromagnetic radiation according to claim 1 or claim 2, in which the optical focusing system converts each laser radiation pulse from an incident plane wave to a convergent spherical wave.

4. Apparatus for generating high intensity short duration pulses of electromagnetic radiation according to claim 3, in which the optical focusing system is a microscope optical system with a numeric aperture above 0.4

5. Apparatus for generating high intensity short duration pulses of electromagnetic radiation according to claim 2 or claim 3 in which the optical focusing system includes at least one axicon element.

6. Apparatus for generating high intensity short duration pulses of electromagnetic radiation according to claim 5 in which the focusing optical system includes a reflection axicon element.

7. Apparatus for generating high intensity short duration pulses of electromagnetic radiation according to claim 6 in which the focusing optical system includes a refraction axicon element having an axial bore through which target material is supplied to the focus of the axicon element.

8. Apparatus for generating high intensity short duration pulses of electromagnetic radiation according to claim 7 in which the axicon element has a refractive index and a cone angle such that the wavefront of the laser radiation emerging from the axicon element travels along the optical axis of the axicon with a velocity at least approximately equal to the propagation velocity of X-ray radiation in the target.

9. Apparatus for generating high intensity short duration pulses of electromagnetic radiation according to claim 8 in which the focusing optical system includes a first conical axicon followed by a second double truncated cone axicon.

10. Apparatus for generating high intensity short duration pulses of electromagnetic radiation according to claim 9 in which the second axicon has a refractive index and a cone angle such that the wavefront of the laser radiation emerging from said second axicon element travels along the optical axis of said second axicon with a velocity at least approximately equal to the propagation velocity of X-ray radiation in the target.

* * * * *